United States Patent
Tong et al.

(10) Patent No.: US 12,455,335 B2
(45) Date of Patent: Oct. 28, 2025

(54) METHOD AND DEVICE FOR WATER-FAT SEPARATION OF IMAGE, COMPUTER APPARATUS, AND COMPUTER-READABLE STORAGE MEDIUM

(71) Applicant: SHANGHAI UNITED IMAGING HEALTHCARE CO., LTD., Shanghai (CN)

(72) Inventors: Li Tong, Shanghai (CN); Tao Sun, Shanghai (CN); Yang Xin, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 311 days.

(21) Appl. No.: 18/200,537

(22) Filed: May 22, 2023

(65) Prior Publication Data
US 2023/0384407 A1 Nov. 30, 2023

(30) Foreign Application Priority Data
May 24, 2022 (CN) .......................... 202210571362.0

(51) Int. Cl.
  *G01R 33/56* (2006.01)
  *G01R 33/48* (2006.01)
  (Continued)

(52) U.S. Cl.
  CPC ..... *G01R 33/5607* (2013.01); *G01R 33/4828* (2013.01); *G06T 5/70* (2024.01);
  (Continued)

(58) Field of Classification Search
  CPC ........... G01R 33/5607; G01R 33/4828; G01R 33/56; G01R 33/5615; G01R 33/5608;
  (Continued)

(56) References Cited

U.S. PATENT DOCUMENTS 8,890,526 B2 * 11/2014 Weng .................. A61B 5/4875
  324/309
10,068,328 B2 * 9/2018 Wang .................... G06T 11/008
  (Continued)

*Primary Examiner* — Michael S Osinski

(57) ABSTRACT

Method and device for water-fat separation of image, computer apparatus, and computer-readable storage medium. The method includes: obtaining plurality of echo images of a target object; obtaining an initial water and fat distribution image of the target object; determining a first error phasor candidate and a second error phasor candidate, the first error phasor candidate being used to characterize an error phasor of each element corresponding to water occupying a major constituent, and the second error phasor candidate being used to characterize an error phasor of each element corresponding to fat occupying a major constituent; determining an initial-guess of error phasor corresponding to each element in the plurality of echo images among the first error phasor candidate and the second error phasor candidate based on the initial water and fat distribution image; determining an optimal error phasor based on the initial-guess of the error phasor; and acquiring a water image and a fat image of the target object from the plurality of echo images according to the optimal error phasor.

16 Claims, 8 Drawing Sheets

Water Image | Fat Image

(51) Int. Cl.
*G06T 5/70* (2024.01)
*G06T 7/00* (2017.01)
*G06T 7/11* (2017.01)

(52) U.S. Cl.
CPC .............. *G06T 7/0012* (2013.01); *G06T 7/11* (2017.01); *G06T 2200/04* (2013.01); *G06T 2207/10088* (2013.01)

(58) Field of Classification Search
CPC .............. G01R 33/543; G01R 33/5616; G01R 33/56527; G01R 33/4833; G01R 33/485; G01R 33/50; G01R 33/561; G01R 33/4818; G06T 5/70; G06T 7/0012; G06T 7/11; G06T 2200/04; G06T 2207/10088; G06T 2207/20081; G06T 11/008; G06T 2207/20084; Y02A 90/30; A61B 5/055; A61B 5/4872; A61B 5/4869; A61B 5/4875

See application file for complete search history.

(56) References Cited

U.S. PATENT DOCUMENTS

| | | | | |
|---|---|---|---|---|
| 10,359,489 | B2* | 7/2019 | Boernert | G01R 33/4828 |
| 10,671,939 | B2* | 6/2020 | Knoll | G06T 11/006 |
| 11,372,067 | B2* | 6/2022 | Choi | G01R 33/4828 |
| 11,693,072 | B2* | 7/2023 | Cheng | G06T 7/262 324/309 |
| 11,835,611 | B2* | 12/2023 | Basser | A61B 5/0044 |
| 12,189,010 | B2* | 1/2025 | Blackledge | A61B 5/0033 |
| 12,235,339 | B2* | 2/2025 | Zeller | G06N 3/0464 |
| 12,333,512 | B2* | 6/2025 | Cella | G02B 26/00 |
| 2003/0060697 | A1* | 3/2003 | Zhang | A61B 5/055 600/410 |
| 2005/0122105 | A1* | 6/2005 | Avram | G01R 33/4828 324/309 |
| 2005/0171422 | A1* | 8/2005 | Zhang | A61B 5/055 600/410 |
| 2006/0250131 | A1* | 11/2006 | Reeder | G01R 33/4828 324/309 |
| 2007/0098298 | A1* | 5/2007 | Xiang | G01R 33/4828 382/128 |
| 2011/0267054 | A1* | 11/2011 | He | A61B 5/055 324/309 |
| 2012/0126813 | A1* | 5/2012 | Paul | G01R 33/56527 324/309 |
| 2012/0301007 | A1* | 11/2012 | Shirai | A61B 5/4869 382/131 |
| 2013/0214781 | A1* | 8/2013 | Hernando | G01R 33/4828 324/309 |
| 2013/0214783 | A1* | 8/2013 | Zhao | G01R 33/4828 324/309 |
| 2013/0249554 | A1* | 9/2013 | Simonetti | G01R 33/583 324/309 |
| 2013/0285658 | A1* | 10/2013 | Zhao | G01R 33/4828 324/309 |
| 2014/0035575 | A1* | 2/2014 | Kabasawa | G01R 33/4828 324/309 |
| 2014/0167755 | A1* | 6/2014 | Nickel | G01R 33/4828 324/309 |
| 2015/0042334 | A1* | 2/2015 | Kannengiesser | G01R 33/3664 324/309 |
| 2016/0154081 | A1* | 6/2016 | Chung | G01R 33/543 324/309 |
| 2016/0216352 | A1* | 7/2016 | Eggers | G01R 33/5608 |
| 2016/0247299 | A1* | 8/2016 | Tan | G06T 7/0012 |
| 2016/0313421 | A1* | 10/2016 | Fuderer | G01R 33/4828 |
| 2017/0027472 | A1* | 2/2017 | Gdaniec | A61B 5/4869 |
| 2017/0192075 | A1* | 7/2017 | Nakai | G01R 33/4828 |
| 2017/0363699 | A1* | 12/2017 | Ookawa | G01R 33/543 |
| 2018/0088197 | A1* | 3/2018 | Suh | G01R 33/5608 |
| 2018/0098711 | A1* | 4/2018 | Leporq | G01R 33/4828 |
| 2018/0144472 | A1* | 5/2018 | Kullberg | G01R 33/4828 |
| 2018/0217216 | A1* | 8/2018 | Suh | G01R 33/4828 |
| 2018/0275235 | A1* | 9/2018 | Reeder | G01R 33/50 |
| 2019/0011515 | A1* | 1/2019 | Zheng | G01R 33/56572 |
| 2019/0076049 | A1* | 3/2019 | Satoh | G01R 33/243 |
| 2019/0137586 | A1* | 5/2019 | Wiesinger | G01R 33/4828 |
| 2019/0212404 | A1* | 7/2019 | De Weerdt | G01R 33/243 |
| 2019/0333227 | A1* | 10/2019 | Zhang | G06F 18/217 |
| 2020/0309884 | A1* | 10/2020 | Bekku | G01R 33/5608 |
| 2020/0355772 | A1* | 11/2020 | Eggers | G01R 33/56554 |
| 2021/0109177 | A1* | 4/2021 | De Weerdt | G01R 33/5607 |
| 2022/0171008 | A1* | 6/2022 | Zeller | G01R 33/5608 |
| 2022/0196769 | A1* | 6/2022 | Sommer | G06N 3/084 |
| 2023/0038530 | A1* | 2/2023 | Eggers | G01R 33/56509 |
| 2023/0236272 | A1* | 7/2023 | Vasanawala | G06T 7/0012 324/309 |
| 2023/0288511 | A1* | 9/2023 | Shirai | G01R 33/5615 |
| 2023/0333185 | A1* | 10/2023 | Block | G01R 33/4838 |
| 2023/0366962 | A1* | 11/2023 | Eggers | G01R 33/5608 |

* cited by examiner $I_1$ $I_2$ $M_1$ $M_2$

B S

Pu Pv

Image A

Image C

Image B

Image D

Water Image　　　　　　　　　　Fat Image

METHOD AND DEVICE FOR WATER-FAT SEPARATION OF IMAGE, COMPUTER APPARATUS, AND COMPUTER-READABLE STORAGE MEDIUM

CROSS-REFERENCE TO RELATED APPLICATION

The present application claims the priority of Chinese Patent Application No. 202210571362.0, filed on May 24, 2022 and entitled "METHOD AND DEVICE FOR WATER-FAT SEPARATION OF IMAGE, APPARATUS, AND COMPUTER-READABLE STORAGE MEDIUM", which is hereby incorporated by reference in its entirety.

TECHNICAL FIELD

This application relates to the image processing technology, and in particular, to a method and a device for water-fat separation of image, a computer apparatus, and a computer-readable storage medium.

BACKGROUND

The water-fat separation imaging technique is an advanced magnetic resonance imaging (MRI) diagnostic means widely used in clinical diagnosis. Compared with some early technique for fat-suppressed imaging, the water-fat separation imaging can not only clearly visualize lesions and surrounding tissues with fat suppression, but also be applied for the diagnosis of fat-related disorders, therefore the water-fat separation imaging is of great clinical value.

SUMMARY

The present disclosure provides a method and a device for water-fat separation of image, a computer apparatus, and a computer-readable storage medium.

In a first aspect, the present disclosure provides a method for water-fat separation of image, and the method includes following steps.

A plurality of echo images of a target object are obtained.

An initial water and fat distribution image of the target object is obtained.

A first error phasor candidate and a second error phasor candidate are determined. The error phasor is used to describe any undesired extra phase with the two image acquisitions, include main magnetic field inhomogeneity, eddy currents, etc. The first error phasor candidate are used to characterize an error phasor of each element corresponding to water occupying a major constituent in this element, and the second error phasor candidate are used to characterize an error phasor of each element corresponding to fat occupying a major constituent in this element.

An initial-guess of the error phasor corresponding to each element in the plurality of echo images are determined among the first error phasor candidate and the second error phasor candidate based on the initial water and fat distribution image.

An optimal error phasor is determined based on the initial-guess of the error phasor, and a water image and a fat image of the target object are acquired from the plurality of echo images according to the optimal error phasor. Specifically, a refinement is performed on the initial-guess of the error phasor to obtain the optimal error phasor. The refinement of the initial-guess of error phasor may be realized by smooth filtering, region growing algorithms, iterative algorithms, etc.

In one of the embodiments, the acquiring the initial water and fat distribution image of the target object includes following steps.

A tissue segmentation is performed on the plurality of echo images to obtain a plurality of tissue-segmented images.

Water-fat ratios of various tissues in the plurality of tissue-segmented images are determined according to priori knowledge of water-fat ratio, to obtain the initial water and fat distribution image.

In one of the embodiments, the acquiring the initial water and fat distribution image of the target object includes following steps.

Fat-suppressed images of the target object are obtained.

The plurality of echo images are registered (if necessary) and compared with the fat-suppressed sequence images to obtain the initial water and fat distribution image.

In one of the embodiments, the determining the first error phasor candidate and the second error phasor candidate includes following steps.

The first amplitude candidate and the second amplitude candidate of water and fat signals of the target object are determined based on the plurality of echo images and a predefined water-fat signal model.

The first error phasor candidate and the second error phasor candidate are calculated according to the first amplitude candidate and the second amplitude candidate according to the predefined water-fat signal model.

In one of the embodiments, the determining the first error phasor candidate and the second error phasor candidate includes following steps.

When the plurality of echo images include at least three echo images, the first error phasor candidate and the second error phasor candidate are determined by using a variable projection algorithm and a maximum likelihood estimation.

In one of the embodiments, at least one element of the initial water and fat distribution image includes a fat fraction.

In a second aspect, the present disclosure further provides a method for water-fat separation of image, and the method includes following steps.

A plurality of echo images of a target object are obtained.

An initial water and fat distribution image of the target object is obtained, and at least one element of the initial water and fat distribution image includes a fat fraction.

An initial-guess of the error phasor corresponding to each element in the plurality of echo images is determined based on the initial water and fat distribution image.

The optimal error phasor is determined based on the initial-guess of the error phasor. A water image and a fat image of the target object are obtained from the plurality of echo images according to the determined optimal error phasor. Specifically, a refinement is performed on the initial-guess of the error phasor to obtain the optimal error phasor. The refinement of the initial-guess of error phasor may be realized by smooth filtering, region growing algorithms, iterative algorithms, etc.

In one of the embodiments, the obtaining the initial water and fat distribution image of the target object includes: performing a tissue segmentation on the plurality of echo images to obtain a plurality of tissue-segmented images, and determining water-fat ratios of each element in the plurality of tissue-segmented images according to prior knowledge of water-fat ratios of various tissues, to obtain the initial water and fat distribution image.

In one of the embodiments, the obtaining the initial water and fat distribution image of the target object includes: obtaining fat-suppressed images of the target object, and comparing the plurality of echo images with the fat-suppressed images to obtain the initial water and fat distribution image.

In one of the embodiments, the optimal error phasor is obtained by performing an iteration processing on the initial-guess of the error phasor.

In a third aspect, the present disclosure further provides a device for water-fat separation of image, including a first acquiring module, a second acquiring module, and a processing module.

The first acquiring module is configured to acquire plurality of echo images of a target object.

The second acquiring module is configured to acquire an initial water and fat distribution image of the target object.

The processing module is configured to determine the first error phasor candidate and the second error phasor candidate, and the first error phasor candidate is used to characterize an error phasor of each element corresponding to water occupying a major constituent in the element, and the second error phasor candidate is used to characterize an error phasor of each element corresponding to fat occupying a major constituent in the element.

The processing module is further configured to determine an initial-guess of the error phasor corresponding to each element in the plurality of echo images among the first error phasor candidate and the second error phasor candidate based on the initial water and fat distribution image.

The processing module is further configured to determine an optimal error phasor from the initial-guess of the error phasor; and the processing module is further configured to acquire a water image and a fat image of the target object from the plurality of echo images according to the optimal error phasor. Specifically, a refinement is performed on the initial-guess of the error phasor to obtain the optimal error phasor. The refinement of the initial-guess of error phasor may be realized with smooth filtering, region growing algorithms, iterative algorithms, etc.

In a fourth aspect, the present disclosure further provides a computer apparatus including a memory and a processor. A computer program is stored on the memory, and the computer program, when executed by the processor, causes the processor to perform following steps.

A plurality of echo images of a target object are obtained.

An initial water and fat distribution image of the target object is obtained.

A first error phasor candidate and a second error phasor candidate are determined. The first error phasor candidate are used to characterize an error phasor of each element corresponding to water occupying a major constituent in the element, and the second error phasor candidate are used to characterize an error phasor of each element corresponding to fat occupying a major constituent in the element.

An initial-guess of the error phasor corresponding to each element in the plurality of echo images are determined among the first error phasor candidate and the second error phasor candidate based on the initial water and fat distribution image.

An optimal error phasor is determined based on the initial-guess of the error phasor, and a water image and a fat image of the target object are acquired from the plurality of echo images according to the optimal error phasor.

In a fifth aspect, the present disclosure further provides a computer-readable non-transitory storage medium, having a computer program stored thereon. The computer program, when executed by a processor, causes the processor to perform following steps.

A plurality of echo images of a target object are obtained.

An initial water and fat distribution image of the target object is obtained.

A first error phasor candidate and a second error phasor candidate are determined. The first error phasor candidate are used to characterize an error phasor of each element corresponding to water occupying a major constituent in the element, and the second error phasor candidate are used to characterize an error phasor of each element corresponding to fat occupying a major constituent in the plurality of echo images.

An initial-guess of error phasor corresponding to each element in the plurality of echo images are determined among the first error phasor candidate and the second error phasor candidate based on the initial water and fat distribution image.

An optimal error phasor is determined based on the initial-guess of the error phasor, and a water image and a fat image of the target object are acquired from the plurality of echo images according to the optimal error phasor.

In a sixth aspect, the present disclosure further provides a computer product, including a computer program. The computer program, when executed by a processor, causes the processor to perform following steps.

A plurality of echo images of a target object are obtained.

An initial water and fat distribution image of the target object is obtained.

A first error phasor candidate and a second error phasor candidate are determined. The first error phasor candidate are used to characterize an error phasor of each element corresponding to water occupying a major constituent in the element, and the second error phasor candidate are used to characterize an error phasor of each element corresponding to fat occupying a major constituent in the element.

An initial-guess of error phasor corresponding to each element in each of the plurality of echo images are determined among the first error phasor candidate and the second error phasor candidate based on the initial water and fat distribution image.

An optimal error phasor is determined based on the initial-guess of the error phasor, and a water image and a fat image of the target object are acquired from the plurality of echo images according to the optimal error phasor.

In the method and the device for water-fat separation of image, the computer apparatus, and the storage medium, the water image and the fat image of the target object are determined by combining the initial water and fat distribution image corresponding to the acquired plurality of echo images of the target object with the first error phasor candidate for characterizing each element corresponding to water occupying the major constituent in the element and with the second error phasor for characterizing each element corresponding to fat occupying the major constituent in the element. By obtaining the initial water and fat distribution image of the plurality of echo image and by combining with the first error phasor candidate of the water occupying the major constituent and the second error phasor candidate of the fat occupying the major constituent, the probability of the occurrence of the fat-water swap is reduced, and the accuracy of the water-fat separation is improved.

DETAILED DESCRIPTION OF THE EMBODIMENTS

Figure 1:
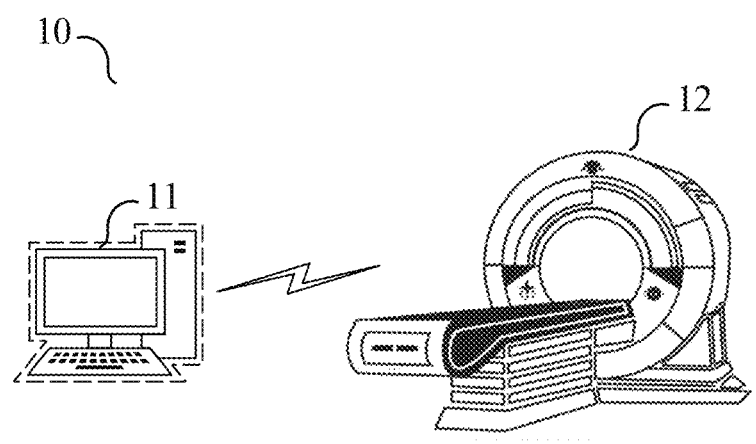
FIG. 1 is a structural view showing a system for water-fat separation of image according to an embodiment.

Technical solutions of some embodiments of the present disclosure will be clearly and completely described herein with reference to the accompanying drawings. It is obvious that the described embodiments are only part of the embodiments of the present disclosure, but not all of the embodiments. Other embodiments obtained by a person of ordinary skill in the art based on the embodiments provided in the present disclosure will all fall within the scope of protection of the present disclosure.

Unless otherwise required in the context, in the entire specification and claims, the term "comprise" and other forms such as a third-person singular form "comprises" and a present participle form "comprising" are interpreted to indicate open and inclusive, i.e., "including, but not limited to". In the description of the specification, the terms such as "an embodiment", "some embodiments", "exemplary embodiments", "example", "specific example", or "some examples" are intended to indicate that a particular feature, structure, material, or characteristic associated with the embodiment or example, is included in at least one embodiment or example of the present disclosure. The above terms are not necessarily indicative of the same embodiment or example. In addition, the particular features, structures, materials, or characteristics may be included in any one or more embodiments or examples in any appropriate manner.

Hereinafter, the terms "first" and "second" are used for descriptive purposes only but not to be construed as indicating or implying relative importance or implicitly specifying the number of indicated technical features. Accordingly, the features defined as "first" and "second" may explicitly or implicitly include one or more of such features. In the description of embodiments of this disclosure, unless otherwise specified, "plurality" means two or more.

When describing some embodiments, the expressions "coupled" and "connected" and derivatives thereof may be used. For example, the term "connected" may be used in describing some embodiments to indicate that two or more components are in direct physical contact or electrical contact with each other. In other examples, the term "coupled" may be used in describing some embodiments to indicate that two or more components are in direct physical contact or electrical contact with each other. However, the term "coupled" or "communicatively coupled" may also refer to two or more components that are not in direct contact with each other, but still collaborate or interact with each other. The disclosed embodiments are not necessarily limited to the content herein.

"At least one of A, B and C" has the same meaning as "at least one of A, B or C", and includes the following combinations of A, B and C: A only, B only, C only, a combination of A and B, a combination of A and C, a combination of B and C, and a combination of A, B and C.

As used herein, the term "if" is optionally interpreted to mean "when . . . " or "at . . . " or "in response to determining" or "in response to detecting" according to the context. Similarly, the phrase "if it is determined that . . . " or "if it (the stated condition or event) is detected" is optionally interpreted to mean "when determining . . . " or "in response to determining . . . " or "when detecting (the stated condition or event)" or "in response to detecting (the stated condition or event)" according to the context.

The terms "applicable to" or "configured to" are used herein to imply open and inclusive language that does not exclude devices that are applicable to or configured to perform additional tasks or steps.

In addition, the use of "based on" or "according to" implies openness and inclusiveness, since processes, steps, calculations or other actions that are "based on" or "according to" one or more of the stated conditions or values may be based on additional conditions or values in practice.

In the existing art, the true error phasor is usually estimated based on a spatial smoothness assumption of an error phasor, and the water image and the fat image are calculated accordingly based on the determined error phasor to achieve a water-fat separation. However, in practical applications, a fat-water swap may occur frequently during the water-fat separation in the existing art due to limitations of physical factors such as a severe inhomogeneous main magnetic field and eddy currents, etc., thus reducing the accuracy of the water-fat separation.

The water-fat separation technique is originated from the Dixon method proposed in 1984. The Dixon method utilizes the chemical shift of water protons and fat protons for imaging, which is a characterized by the frequency difference between the Larmor frequencies of water and fat protons. The Dixon method collects two echo images when the water protons and the fat protons are in-phase (IP) and out-of-phase (OOP) by adjusting the echo times (TE) for each image. When the echo is collected for the first time, transverse magnetization vectors of the water and fat protons are in phase, so the water signal and the fat signal are superimposed. When the echo is collected for the second time, the transverse magnetization vectors of the water and the fat are out of phase, so the water signal and the fat signal are offset against each other. By imaging when the water and fat are in phase and out of phase, the intensities of the water signal and the fat signal may be calculated, respectively, thus realizing the water-fat separation imaging.

The original Dixon method can only be applicable to an ideal condition that a main magnetic field B0 is perfectly uniform. Current water-fat separation techniques have been developed by making various improvements based on the original Dixon algorithm, to improve the accuracy of the water-fat separation. One of the water-fat separation algorithms widely used in the current magnetic resonance imaging is an in-phase and partially-opposed-phase (POP) two-point method. In the two-point method, the error phasor of the dual-echo images needs to be accurately estimated to accurately separate the water signal and the fat signal. Specifically, based on the spatial smoothness assumption of the error phasor, the true error phasor is estimated by an iterative spatial smoothing algorithm, and the water signal and the fat signal are calculated accordingly. The fat-water swap artifact may frequently occur during the water-fat separation in the existing art due to limitations of physical factors such as the severe inhomogeneous main magnetic field and the eddy currents, etc., thus reducing the accuracy of the water-fat separation.

In view of the above technical problems, an embodiment of the present disclosure provides a method for water-fat separation of image. In this method, an initial water-fat distribution image is obtained by pre-separating an acquired plurality of echo image of a target object. An initial-guess of error phasor is determined between the first error phasor candidate of each element corresponding to water occupying a major constituent and the second error phasor candidate of each element corresponding to fat occupying a major constituent. A water signal image and a fat signal image of the target object are determined based on the optimal error phasor by refining the initial-guess of error phasor. A good initial-guess of the error phasor would significantly ease the process of error phasor refinement, leading to a more robust and accurate water fat separation. The water occupying a major constituent refers to, in the element of an echo image, a content of the water is greater than a content of the fat. The fat occupying a major constituent refers to, in the element of an echo image, a content of the fat is greater than a content of the water.

In order to implement the embodiment, please refer to a structure of a system 10 for water-fat separation of image shown in FIG. 1. The system 10 for water-fat separation of image includes a device 11 for water-fat separation of image and an imaging device 12. The imaging device 12 may scan the target object, acquire the plurality of echo signals of the target object, and transmit the plurality of echo signals to the device 11 for water-fat separation of image, so that the device 11 for water-fat separation of image obtains corresponding echo images according to the plurality of echo signals of the target object. In the embodiments of the present disclosure, the device 11 for water-fat separation of image and the imaging device 12 may be arranged in the same device or in different devices.

For the case that the device 11 for water-fat separation of image and the imaging device 12 are arranged in different devices, in an exemplary solution, in general, the device 11 for water-fat separation of image may be a terminal device. The terminal device may have an environment or configuration with plurality of purpose or dedicated computing device. For example, the terminal device may be a personal computer, a server computer, a handheld or portable device, a tablet device, a plurality of processor device, or a distributed computing environment including any of the above devices or equipment, etc. The terminal device may have different names such as a user equipment (UE), an access equipment, a terminal unit, a terminal station, a mobile station, a mobile platform, a remote station, a remote terminal, a mobile equipment, a wireless communication equipment, a terminal agent or a terminal device, etc. In the embodiments of the present disclosure, the device for realizing the function of the device 11 for water-fat separation of image may be the terminal device, or a device capable of supporting the device 11 for water-fat separation of image to realize the function, such as a chip system, etc. In the present disclosure, the chip system may consist of a chip, or may include a chip and other discrete components.

Figure 2:
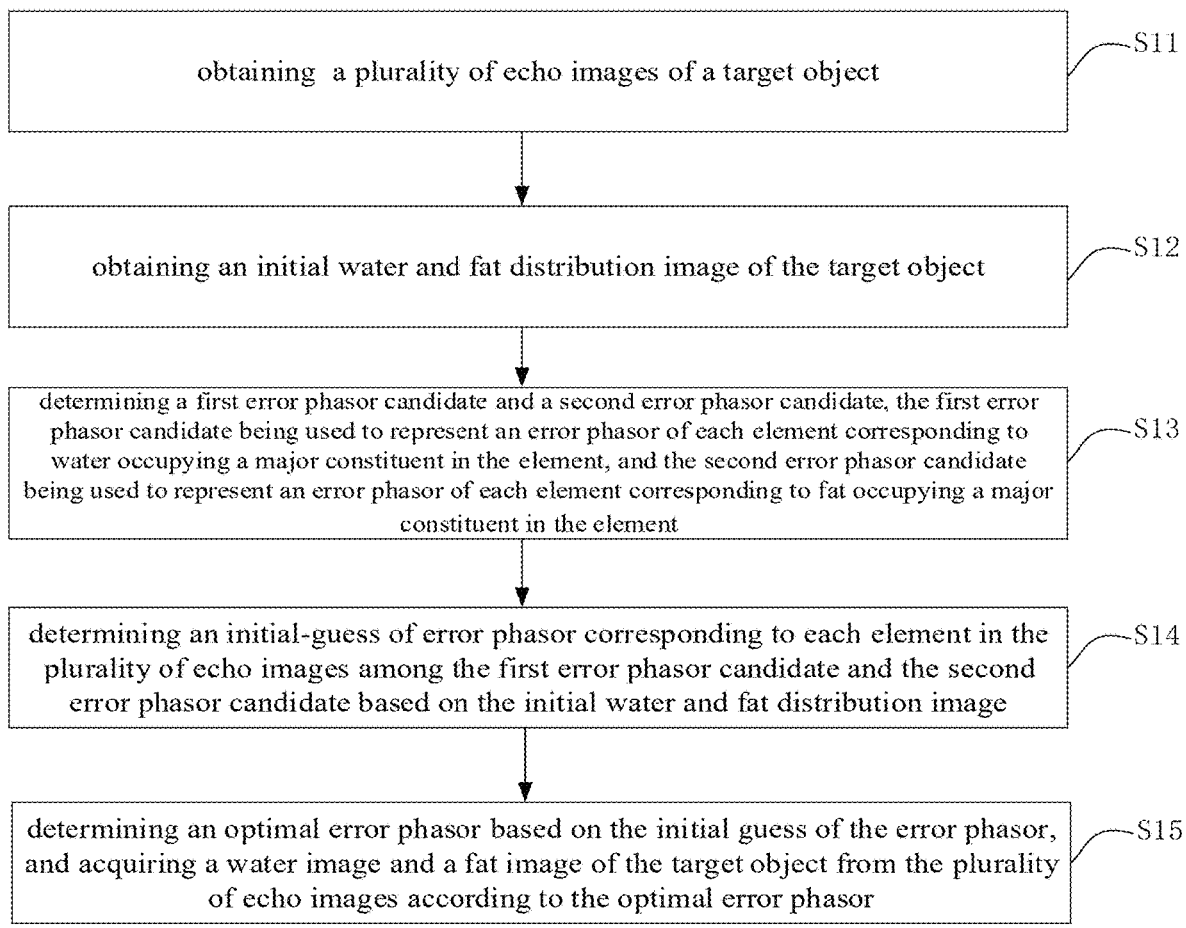
FIG. 2 is a first schematic flow chart of a method for water-fat separation of image according to an embodiment.

With reference to FIG. 1, the method for water-fat separation of image provided by the embodiments of the present disclosure will be described in detail. Referring to FIG. 2, the method includes steps S11 to S15.

At step S11, a plurality of echo images of a target object are obtained.

The number of echo images is plural.

It should be noted that the number of the plurality of echo images is greater than or equal to two, and each of the plurality of echo images corresponds to a different echo time (TE) or a different water-fat phase angle.

At step S12, an initial water and fat distribution image of the target object is obtained.

The initial water and fat distribution image may be obtained from the plurality of echo images, or may be obtained from additional scans applied to the same target object.

It should be understood that the initial water and fat distribution image is a water-fat ratio distribution image obtained based on the plurality of echo images.

In some embodiments, magnetic resonance signal includes two components, namely water and fat. In general, the acquired signals in sequence each are a vector sum of a water signal and a fat signal within a voxel. The DIXON method decomposes the magnetic resonance signal by means of a vector operation, solves water and fat components, and realizes the water-fat separation. Any included angle between the two magnetization vectors of water and fat is obtained by using a chemical shift effect on the basis of a conventional spin echo sequence and by adjusting different TEs. An image with an included angle of water and fat of 0 degree and an image with an included angle of water and fat of 180 degree are acquired respectively, and the water and fat images are calculated based on the two magnetic resonance images. The two-point DIXON technique is named after signals of two different TEs needed to be used, and therefore, an embodiment of the present application may choose to acquire images of two different TEs.

Specifically, the magnetic resonance signals of the target object collected under multiple echoes are acquired, and the collected magnetic resonance signals are converted into the plurality of echo images by an inverse Fourier transform. Effective elements (e.g., foreground elements) in an image domain are extracted, and an amplitude image and a phase image of the elements are obtained. For the plurality of echo images, Dixon angles of the water signal and the fat signal in each echo image are different (one of the phase angles of the water and the fat is usually chosen to be zero, with the others chosen to be non-zero), so that the water signal and the fat signal in the target object may be solved through the plurality of echo images. For example, taking two echo images for an example, the phase angle between the water signal (i.e., the signal corresponding to water) and the fat signal (i.e., the signal corresponding to fat) corresponding to one echo image is $\alpha_0$, and the phase angle between the water signal and the fat signal corresponding to the other echo image is $\alpha_1$. Where, $\alpha_0 \neq \alpha_1$, $\alpha_0 \geq 0$, and $\alpha_1 > 0$. In some embodiments, the echo images are two-dimensional images, and the element in each of the echo images is a pixel. In some embodiments, the echo images are three-dimensional images, and the element in each of the echo images is a voxel.

Specifically, an in-phase image (i.e., the phase of the water signal is the same as the phase of the fat signal) and an echo image in which the phase of the water signal is different from the phase of the fat signal, may be acquired. Typically, the echo image with the second echo having a fully opposed phase or a partially opposed phase (i.e., out-of-phase image) may be selected. In the partially-opposed-phase image, the phase difference between the phase of the water signal and the phase of the fat signal is typically chosen to be greater than 90 degrees and less than 180 degrees, such as 120 degrees, 135 degrees, 150 degrees, etc. The phase angles between water and fat of each echo image are not specifically limited in the embodiments of the present disclosure.

Figure 3:
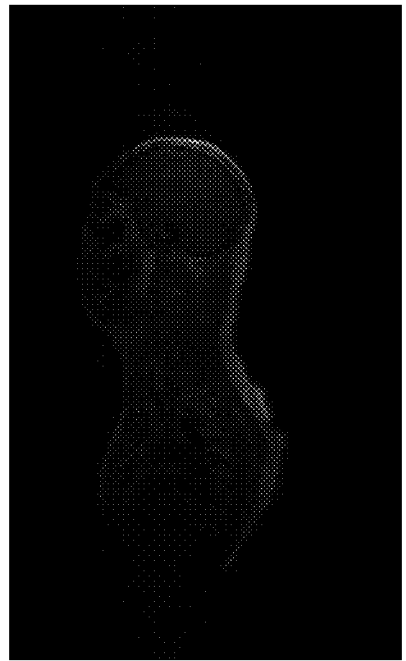
FIG. 3 shows a first pair of exemplary double-echo images according to an embodiment.
Figure 3:
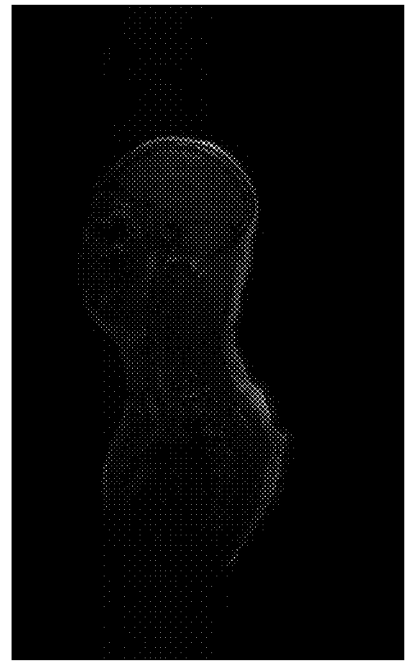

In one of the embodiments, referring to FIG. 3, taking two echo images as an example, a first image is in phase, that is, the corresponding phase angle between the water signal and the fat signal in the image is 0 degree, and a second image is out of phase, that is, the corresponding phase angle between the water signal and the fat signal in the image is $\alpha$. Then, the signal $I_1$ of the element in the first image and the signal $I_2$ of the element in the second image may be represented by the following mathematic equations:

$$I_1 = (W+F)P_1 \quad (1)$$

$$I_2 = (W+Fe^{i\alpha})P_2 \quad (2)$$

Where, W denotes the water signal, F denotes the fat signal, and $P_1$ and $P_2$ denote additional phases of image $I_1$ and $I_2$, respectively.

In another embodiment, assuming that N (N≥3) echo images are acquired, the signal $S(TE_n)$ of each element in the echo image may be represented by the following mathematic equation:

$$S(TE_n) = (W + Fe^{-i2\pi f_F TE_n})e^{-i2\pi \psi TE_n}, n=1,2,\ldots,N \quad (3)$$

Where, W denotes the water signal, F denotes the fat signal, the chemical shift of the water is set to 0, $f_F$ denotes a chemical shift of the fat relative to the water, $TE_n$ denotes the echo time, and $\psi$ denotes a field map value of the static main field $B_0$.

At step S13, a first error phasor candidate and a second error phasor candidate are determined, the first error phasor candidate is used to represent the error phasor of each element corresponding to water occupying a major constituent in the element, and the second error phasor candidate is used to represent an error phasor of each element corresponding to fat occupying a major constituent in the element.

In this embodiment, since the water-fat ratio of each element is unique, only one of the first error phasor candidate and the second error phasor candidate is the true error phasor of the element. In this embodiment, the true error phasor of the element is an error phasor corresponding to true water and fat ratios in this element. Illustratively, if the water component of the current element is relatively higher than fat component, the true error phasor of the element is the first error phasor candidate. On the contrary, if the fat component of the current element is relatively higher than water component, the true error phasor of the element is the second error phasor candidate.

In particular, the method of determining the first error phasor candidate and the second error phasor candidate may be determined based on the number of the acquired echo images. For example, when there are two echo images, the first error phasor candidate and the second error phasor candidate may be determined by solving a triangle. For another example, when there are at least three echo images, the first error phasor candidate and the second error phasor candidate may be determined by the maximum likelihood estimation based on variable projections.

In one of the embodiments, a first amplitude candidate and a second amplitude candidate of the water and fat signals of the target object are determined based on a signal amplitude of each echo image. The first error phasor candidate and the second error phasor candidate are calculated based on the first amplitude candidate and the second amplitude candidate.

Illustratively, taking two echo images as an example, one of the two echo images is an in-phase image, and the other is a partially-opposed-phase image. After the in-phase image and the partially-opposed-phase image are acquired, the first amplitude candidate and the second amplitude candidate may be determined by solving a triangle based on the in-phase amplitude of the in-phase image and the out-of-phase amplitude of the partially-opposed-phase image. The first amplitude candidate is greater than the second amplitude candidate, and one of the first amplitude candidate and the second amplitude candidate is a water amplitude corresponding to water, and the other is a fat amplitude corresponding to fat. That is, there may be two cases: one case is that the water amplitude is the first amplitude candidate, and the fat amplitude is the second amplitude candidate, and the other case is that the water amplitude is the second amplitude candidate and the fat amplitude is the first amplitude candidate.

Specifically, the first amplitude candidate and the second amplitude candidate may be determined according to the following equations (4) and (5):

$$B = \frac{1}{2}\left|M_1 + \sqrt{\frac{2M_2^2 - M_1^2(1+\cos\alpha)}{1-\cos\alpha}}\right| \quad (4)$$

$$S = \frac{1}{2}\left|M_1 - \sqrt{\frac{2M_2^2 - M_1^2(1+\cos\alpha)}{1-\cos\alpha}}\right| \quad (5)$$

Figure 4:
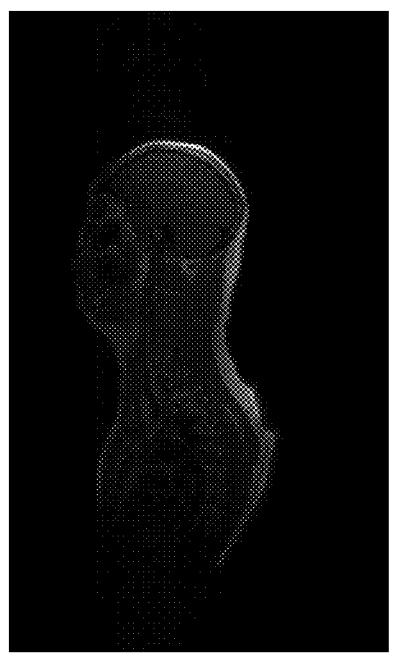
FIG. 4 shows a second pair of exemplary double-echo images according to an embodiment.
Figure 4:
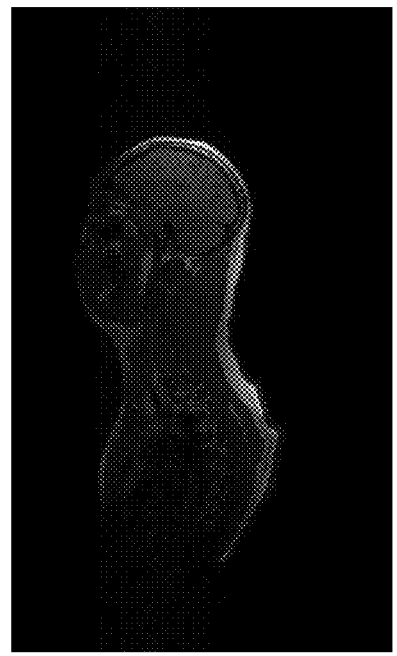
Figure 5:
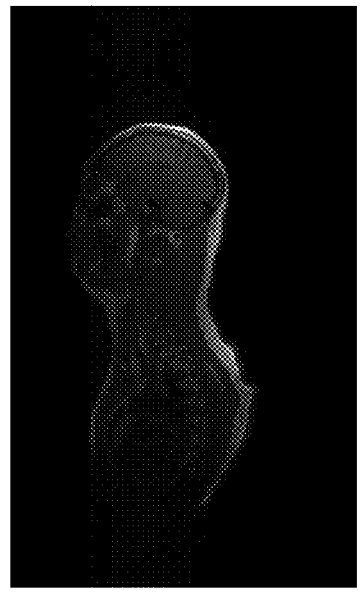
FIG. 5 shows a pair of exemplary first amplitude candidate (B) and second amplitude candidate (S) according to an embodiment.
Figure 5:
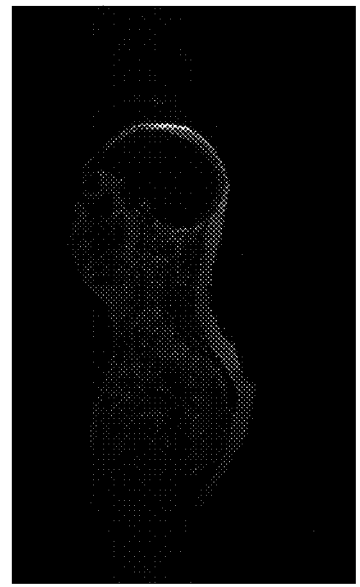

Where, B denotes the first amplitude candidate, and S denotes the second amplitude candidate; $M_1$ denotes the signal amplitude of the in-phase image, $M_2$ denotes the signal amplitude of the partially-opposed-phase image, and $\alpha$ denotes the phase difference of water and fat in the partially-opposed-phase image. $M_1=|I_1|$ and $M_2=|I_2|$. For example, the images corresponding to the signal amplitudes $M_1$ and $M_2$ obtained based on the two echo images shown in FIG. 3 may be referred to FIG. 4. As another example, images corresponding to the first amplitude candidate B and the second amplitude candidate S shown in FIG. 5 may be obtained by calculating the signal amplitudes $M_1$ and $M_2$ corresponding to the two echo images shown in FIG. 4 by using the above equations (4) and (5).

First, according to the above equations (1) and (2), following equations may be deduced reversely:

$$P_1 = I_1/(W+F) \quad (6)$$

$$P_2 = I_2/(W+Fe^{i\alpha}) \quad (7)$$

Assume:

$$J_2 = I_2 P_1^* = \frac{I_2 I_1^*}{|I_1|} = (W + Fe^{i\alpha})P \quad (8)$$

Where, $P=P_2(P_1)^*$, and $P_2(P_1)^*$ has two solution candidates: $P_{S1}$ and $P_{S2}$.

$$P_{s1} = \frac{J_2}{B + Se^{i\alpha}}$$

or $$P_{s1} = \frac{J_2}{S + Be^{i\alpha}}$$

If $P=P_{S1}$, it denotes that the water occupies the major constituent in the element; and if $P=P_{S2}$, it denotes that the fat occupies the major constituent in the element.

The first amplitude candidate B and the second amplitude candidate S are calculated based on the above equations (4) and (5), and the first error phasor candidate and the second error phasor candidate are calculated according to the following equations (9) and (10):

$$P_u = \frac{J_2}{B + Se^{i\alpha}} \quad (9)$$

$$P_v = \frac{J_2}{S + Be^{i\alpha}} \quad (10)$$

Where, $P_u$ denotes the first error phasor candidate, and $P_v$ denotes the second error phasor candidate. For example, images corresponding to the first error phasor candidate and the second error phasor candidate shown in FIG. 6 may be calculated and obtained based on FIG. 5 combining with the above equations (9) and (10).

In the present embodiment, for the acquired in-phase and partially-opposed-phase echo images, the first amplitude candidate and the second amplitude candidate of the target object may be determined by the signal amplitude of each echo image, and the first error phasor candidate and the second error phasor candidate are calculated and obtained according to the first amplitude candidate and the second amplitude candidate.

In another embodiment, the first error phasor candidate and the second error phasor candidate are determined by using the variable projection (VARPRO) algorithm and the maximum likelihood estimation.

Specifically, the above equation (3) may be formulated by the VARPRO algorithm, and a combined estimation for variables in the signal model $S(TE_n)$, such as the water (W), the fat (F), the field $B_0$ (i.e., an unknown error phasor $\phi=e^{-i2\pi\psi TE_n}$, a phase accumulation of the echo signal within time $\Delta TE$), etc., is converted into an estimation for an unknown phase difference of a single variable, and the unknown phase difference $\phi$ may be solved by the maximum likelihood estimation. For example, the above equation (3) may be programmed to be equation (11):

$$\phi_G = \underset{\phi}{\mathrm{argmin}} \|(I - A(\phi)A^+(\phi))S\|^2 \quad (11)$$

Where, $\phi_G$ denotes an error phasor (the phase accumulation of the echo signal within the time $\Delta TE$, and $\Delta TE$ denotes an echo time difference) obtained by the maximum likelihood estimation. $A^+$ is a pseudo-inverse matrix of A, I denotes an N×N identity matrix. The corresponding water and fat may be further obtained according to the solution $\phi_G$ of equation (11): $p=A^+(\phi)S=[W,F]^T$. Where, $P=e^{i2\pi\psi\Delta TE}=e^{i\phi}$, $S=[S(TE1), S(TE2), \ldots, S(TEn)]^T$, and $A^+(\phi))=[A_1; A_2; \ldots; A_N]$.

Further, another candidate solution (aliased solution) $[\phi_S, \rho_S]$ may be obtained by searching a start point $[\bar{\phi}_G, \bar{\rho}_G]$ through a global optimal solution, where $\bar{\phi}_G=[F_G, W_G]^T$ is a solution obtained by exchanging water and fat components in $\rho_G$, and T denotes a transposition operation for a matrix. When $|W_G|>|F_G|$, then $\bar{\phi}_G=\mathrm{angle}(e^{i(\phi_G-\Delta\phi)})$. When $|W_G|<|F_G|$, then $\bar{\phi}_G=\mathrm{angle}(e^{i(\phi_G+\Delta\phi)})$.

By optimizing the equation (12), $[\phi_S, \rho_S]$ may be obtained by searching nearby $[\bar{\phi}_G, \bar{\rho}_G]$:

$$[\phi_S, \rho_S] = \underset{\phi, \rho}{\mathrm{argmin}} \|S - A(\phi)\rho\|_2^2 \quad (12)$$

For two candidate solutions $[\phi_G, \rho_G]$ the solution corresponding to $|W|>|F|$ is the first error phasor candidate, and the solution corresponding to $|W|<|F|$ is the second error phasor candidate. Where, argmin denotes a minimum operation performed for a given function, and $\|x\|_2^2$ denotes a square operation of a two-norm.

In the present embodiment, the first error phasor candidate and the second error phasor candidate of the plurality of echo images may be determined by the VARPRO algorithm and the maximum likelihood estimation algorithm in the case of the plural echo images (i.e., the number of echo images is equal or larger than 3).

At step S14, an initial-guess of error phasor corresponding to each element in each of the plurality of echo images is determined among the first error phasor candidate and the second error phasor candidate based on the initial water and fat distribution image.

Alternatively, for each element in the initial water and fat distribution image, if the element indicates a signal of water occupying the major constituent, the first error phasor candidate is used as the initial-guess of error phasor, and if the element indicates a signal of fat occupying the major constituent, the second error phasor candidate is used as the initial-guess of error phasor.

At step S15, an optimal error phasor is determined based on the initial-guess of the error phasor, and a water signal image and a fat signal image of the target object are acquired from the plurality of echo images according to the optimal error phasor.

Illustratively, the water image and the fat image of the target object are determined based on the optimal error phasor refined from the initial-guess of error phasor by using an iterative smooth filtering algorithm, a region growth algorithm, or an IDEAL algorithm, etc.

In the present embodiment, the initial-guess of error phasor corresponding to each element in the plurality of echo images is selected from the first error phasor candidate and the second error phasor candidate by the initial water and fat distribution image, thereby reducing the probability of the occurrence of the fat-water swap during the water-fat separation.

It should be understood that at this step, the optimal error phasor may be estimated from the first error phasor candidate and the second error phasor candidate by refining the initial-guess of error phasor, thereby determining the water image and the fat image of the target object based on the optimal error phasor.

In one of the embodiments, another method for water-fat separation of image is provided, and the method may be implemented by following means.

A plurality of echo images of a target object are obtained. An initial water and fat distribution image of the target object is obtained, and at least one element of the initial water and fat distribution image includes a fat fraction. An initial-guess of error phasor corresponding to each element in each of the plurality of echo images is determined based on the initial water and fat distribution image. According to the initial-guess of error phasor, a water image and a fat image of the target object are obtained from the plurality of echo images.

Each step may be implemented with reference to the implementation provided in the embodiments above, which will not described in detail hereinafter.

In the method and the device for water-fat separation of image, the computer apparatus, and the storage medium, an initial water and fat distribution image corresponding to the acquired plurality of echo images of the target object is obtained to generalize an initial-guess of the error phasor from the two error phasor candidates, with the first error phasor candidate representing each element corresponding to water occupying the major constituent and the second error phasor candidate representing each element corresponding to fat occupying the major constituent. The water image and the fat image of the target object may be obtained from the optimal error phasor refined from the initial-guess of the error phasor. By obtaining the initial water and fat distribution image of the plurality of echo images to form an initial-guess of error phasor, the probability of the occurrence of the fat-water swap artifact is reduced, and the accuracy of the water-fat separation is improved.

Figure 7:
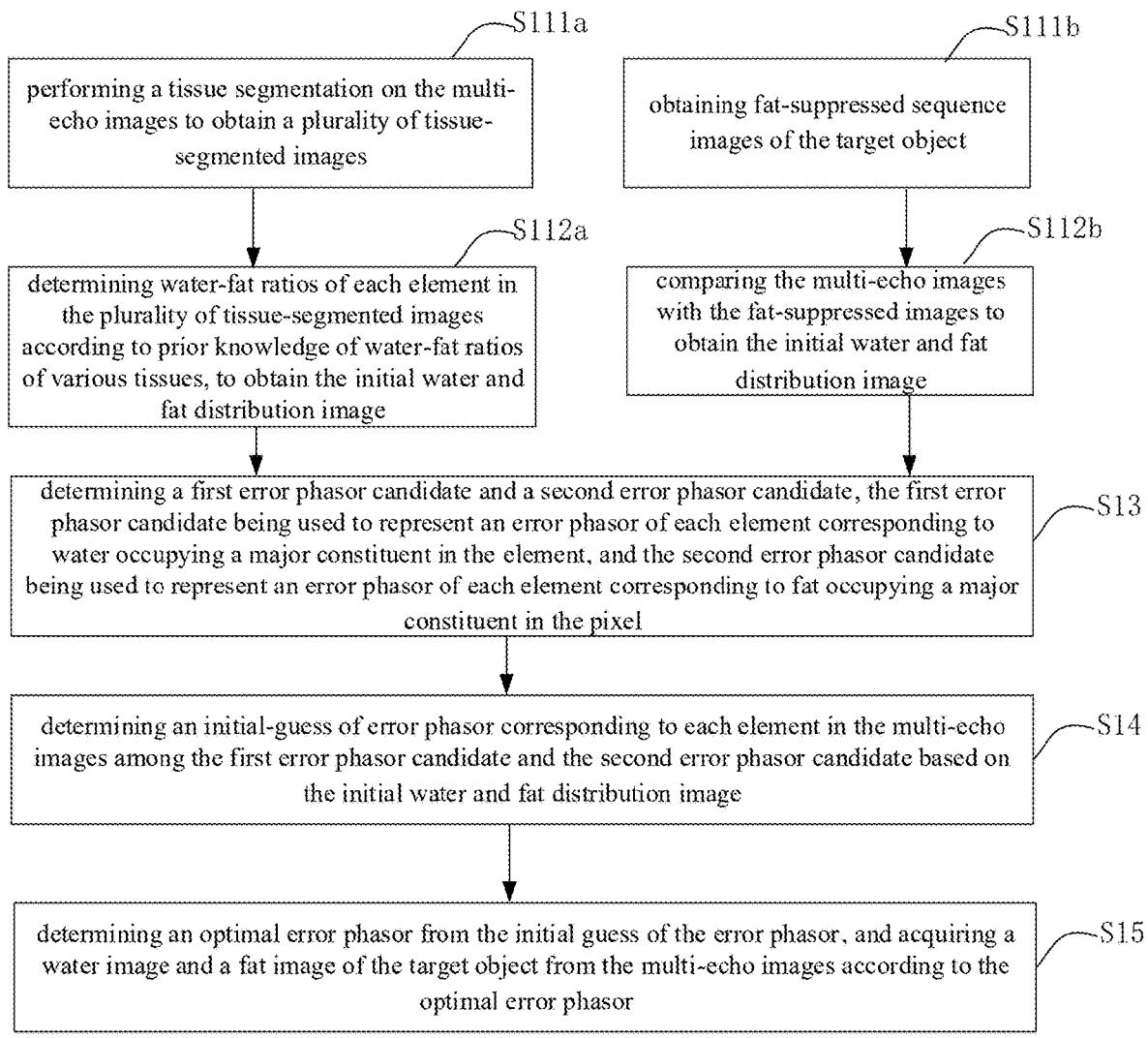
FIG. 7 is a second schematic flow chart of the method for water-fat separation of image according to an embodiment.

In one of the embodiments, referring to FIG. 7, in order to improve the accuracy of the water-fat separation, the initial water and fat distribution image may be determined by a priori knowledge, and the step S11 specifically includes step S111a and step S112a.

At step S111a, a tissue segmentation is performed on the plurality of echo images to obtain a plurality of tissue-segmented images.

Optionally, a semantic segmentation model is pre-trained based on an algorithm such as an artificial neural network algorithm, and different tissues in the plurality of echo images are segmented by the semantic segmentation model (i.e. tissue segmentation).

Illustratively, if the plurality of echo images contain two kinds of tissues, such as muscle and fat, the plurality of echo images are inputted into a pre-trained tissue segmentation model, thereby obtaining a muscle segmentation result outputted by the tissue segmentation model, or obtaining a fat segmentation result outputted by the tissue segmentation model, or obtaining the muscle segmentation result and the fat segmentation result simultaneously outputted by the tissue segmentation model.

At step S112a, water-fat ratios of each element in the plurality of tissue-segmented images are determined according to the prior knowledge of water-fat ratios of various tissues, to obtain the initial water and fat distribution image.

Specifically, the segmentation result is converted into a rough water-fat ratio image (i.e., the initial water and fat distribution image) according to the prior knowledge of water-fat ratios of different tissues (e.g., fat and muscle).

In the present embodiment, by performing the tissue segmentation on the plurality of echo images, the plurality of tissue-segmented images are obtained, and the water-fat ratios of each element in the plurality of tissue-segmented images are determined according to prior knowledge of water-fat ratio of various tissues, so that a relative value of the water and fat signal of each voxel may be preliminarily determined. The initial water and fat distribution image, which is obtained based on the water-fat ratios of various tissues in the tissue-segmented images, may assist in the water-fat separation, thereby improving the accuracy of the water-fat separation.

In an embodiment, referring to FIG. 7, in order to improve the accuracy of the water-fat separation, additional fat-suppressed images corresponding to the plurality of echo images may also be acquired to determine the initial water and fat distribution image. Therefore, step S11 further includes steps S111b and S112b.

At step S111b, fat-suppressed images of the target object are obtained.

Optionally, the fat-suppressed images, which have the same geometric parameters as the plurality of echo images, are obtained. For example, the geometric parameters include the field of view (FOV) and layer spacing (e.g., distances between adjacent layers). In some embodiments, the geometric parameters of the original plurality of echo images and the fat-suppressed images may be different as long as they can registered during post-processing.

Specifically, the fat-suppressed images may be obtained by scanning the target object by using common fat-suppression techniques in magnetic resonance imaging.

Figure 8:
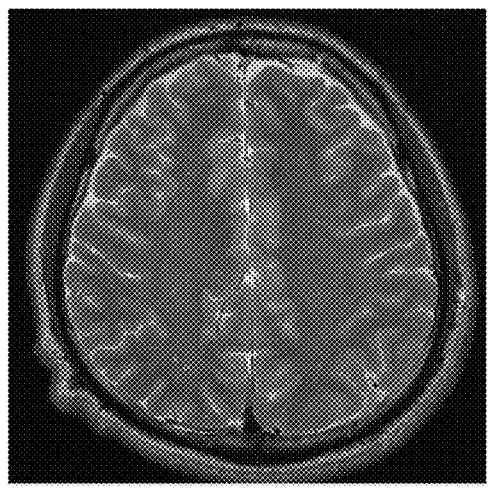
FIG. 8 shows images illustrating fat-suppressed images according to an embodiment.
Figure 8:
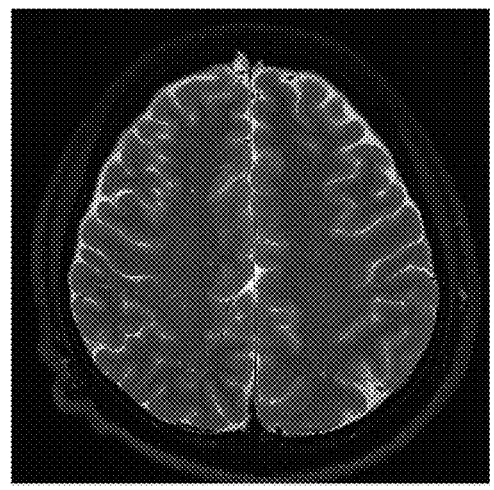
Figure 8:
Figure 8:
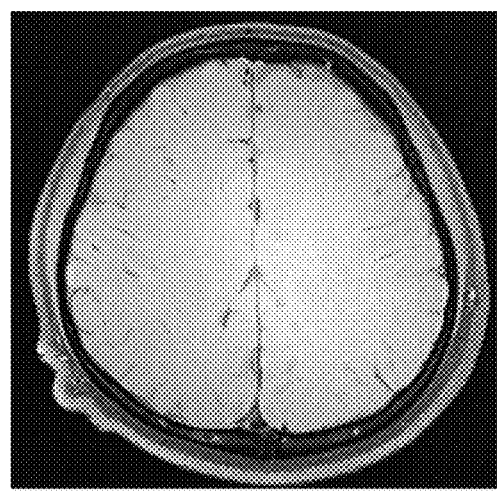

Illustratively, the magnetic resonance imaging with fat suppression may use a Short Time of Inversion Recovery (STIR) technique, a SPectral Attenuated Inversion Recovery (SPAIR) technique, and a FatSat technique (short-duration RF-pulses with center frequency set to stimulate only fat protons), etc. For example, referring to FIG. 8, the same object may be imaged by using different fat suppression techniques to obtain fat-suppressed images corresponding to the plurality of echo images. Where, an image A is an image without fat-suppression, an image B is a fat-suppressed image obtained by scanning the same object by using the STIR technique described above, an image C is a fat-suppressed image obtained by scanning the same object by using the SPAIR technique above, and an image D is a fat-suppressed image obtained by scanning the same object by using the FatSat technique.

The Spectral Presaturaton with Inversion Recovery (SPIR) utilizes a precession frequency difference of H protons in water and H protons in fat to suppress fat. This precession frequency difference is an essence of chemical shift artifacts, and is also a fundamental principle of spectral imaging.

At step S112b, the plurality of echo images and the fat-suppressed images are registered (if necessary) and compared to obtain the initial water and fat distribution image.

Specifically, elements in each echo image may be subtracted from or divided by elements in the corresponding fat-suppressed sequence image, to determine the water-fat ratio of each element, thereby obtaining the initial water and fat distribution image.

Further, the determination of the initial water and fat distribution image of the embodiment of the present application is not limited to the manners described in steps S111a and S112a, and steps S111b and S112b, and the water-fat ratio of each element may be obtained by a water-fat ratio predicting model trained by a machine learning algorithm or a deep learning algorithm, thereby obtaining the initial water and fat distribution image.

In the present embodiment, the water-fat ratio of each tissue in the tissue-segmented images is determined by comparing the plurality of echo images with the corresponding fat-suppressed sequence images, so that a ratio of the water and fat signal of each voxel may be preliminarily determined. The initial water and fat distribution image, which is obtained based on the water-fat ratio of each tissue in the tissue-segmented images, may assist the water-fat separation, thereby improving the accuracy of the water-fat separation.

In one of the embodiments, at least one element in the initial water and fat distribution image includes the fat fraction.

The element having the fat fraction in the initial water and fat distribution image provides additional information for the initial-guess of error phasor, or provides a constraint for the iterative refinement of the error phasor of a subsequent water-fat separation algorithm.

The error phasor initialization may be that, for example, an error phasor of a voxel having a fat fraction less than 0.5 in the water and fat distribution image may be initialized to be the first error phasor candidate, and an error phasor of a voxel having a fat fraction greater than 0.5 in the water and fat distribution image may be initialized to be the second error phasor candidate.

The constraint for the algorithm may be that, for example, for relatively reliable voxels (e.g., with a water-fat ratio less than 0.1 or greater than 0.9) in the water and fat distribution image, the water fat separation results of these voxels outputted by the algorithm may be restricted to conforming to the initial water and fat distribution image, thereby reducing the error of the water-fat swap caused by the algorithm.

Figure 9:
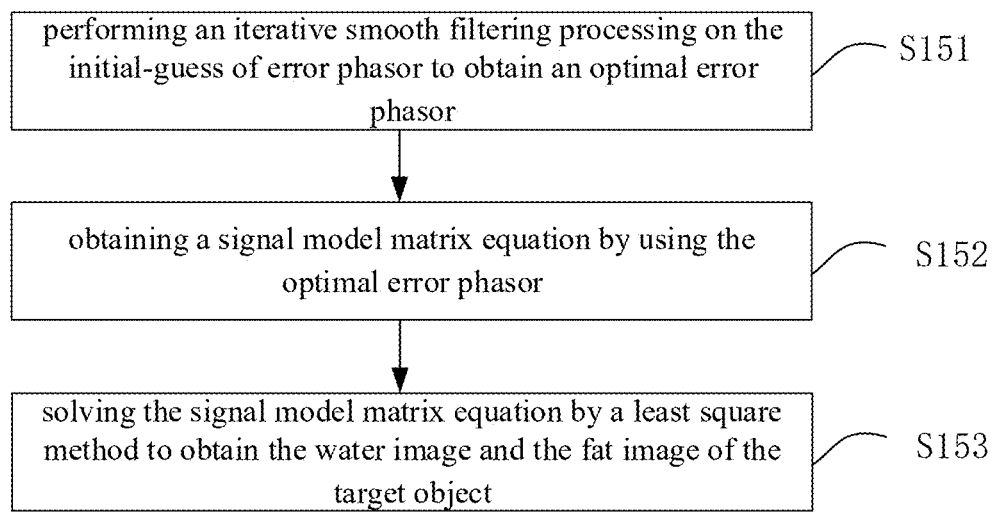
FIG. 9 is a third schematic flow chart of the method for water-fat separation of image according to an embodiment.

In one of the embodiments, referring to FIG. 9, the step S15 specifically includes steps S151 to S153.

At step S151, an iterative refining processing is performed on the initial-guess of error phasor, to obtain the optimal error phasor for subsequent water-fat separation.

In one of the embodiments, an iterative smooth filtering processing is performed on the initial-guess of error phasor, to obtain the optimal error phasor.

Alternatively, a spatial average smoothing method may be used to perform the iterative smooth filtering processing on the initial-guess of error phasor, or any other filtering method may be used to filter the initial-guess of error phasor. The new error phasor determined from the smoothed error phasor may be denoted as $\hat{P}$. For each round of smooth filtering, a difference between the new error phasor and the previous error phasor is calculated.

Further, it is determined whether the difference is less than or equal to a preset threshold value, and if yes, the iterative smooth filtering is terminated and the last error phasor is determined as the final/optimal error phasor for subsequent water-fat separation. In this way, if the current error phasor $\hat{P}$ does not change within consecutive iterations, it indicates that the iteration has converged and the current error phasor $\hat{P}$ is outputted as the optimal error phasor. Typically, this optimal error phasor can be further refined with a last round of spatial smooth filtering.

Figure 6:
FIG. 6 shows a pair of exemplary first error phasor candidate (Pu) and second error phasor candidate (Pv) according to an embodiment.
Figure 6:

Illustratively, the iterative smooth filtering processing is performed on the initial-guess of error phasor determined based on the first error phasor candidate and the second error phasor candidate obtained in the embodiment of FIG. 6, to obtain the optimal error phasor.

In another embodiment, the initial-guess of error phasor is determined based on the first error phasor candidate and the second error phasor candidate obtained by equation (12), and the optimal error phasor $\hat{P}$ is determined by an algorithm such as a Region Growing (RG), or a Transition REgion extraction (TREE).

At step S152, a signal model matrix equation for the plurality of echo images is obtained by using the optimal error phasor.

Figure 10:
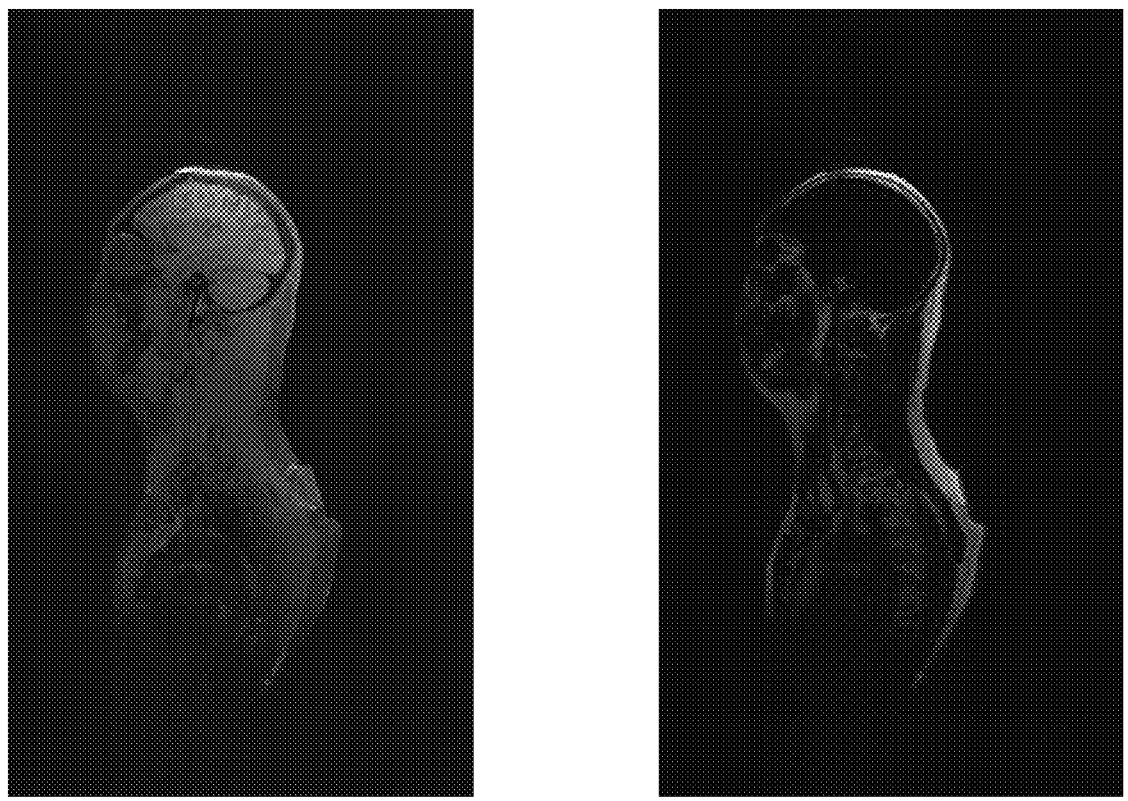
FIG. 10 illustrates a pair of exemplary water image and fat image separated from acquired plurality of echo images according to an embodiment.

In an example, the optimal error phasor $\hat{P}$ obtained based on the embodiment of FIG. 10 is removed from the signal $I_2$ of the elements in the second echo image, and the following equation (13) is obtained based on the equation (8) above:

$$J_2^* = J_2 P^* = W + F e^{i\alpha} \quad (13)$$

The above equation (13) is arranged in the form of a matrix equation as equation (14):

$$AX = J \quad (14)$$

Where, $$A = \begin{bmatrix} 1 & 1 \\ 1 & \cos\alpha \\ 0 & \sin\alpha \end{bmatrix},$$

$$J = \begin{bmatrix} M_I \\ \mathrm{Real}(J_2^*) \\ \mathrm{Imag}(J_2^*) \end{bmatrix},$$

and $$X = \begin{bmatrix} W \\ F \end{bmatrix}$$

In another embodiment, the initial-guess of error phasor is determined based on the first error phasor candidate and the second error phasor candidate obtained by the equation (12), and the optimal error phasor $\hat{P}$ is determined by the initial-guess of error phasor and an refinement algorithm such as the Region Growing (RG) or the Transition Region extraction (TREE). The optimal error phasor $\hat{P}$ and $R_2^*$ (i.e., $1/T_2^*$) may be iterated alternately by the matrix equation (15):

$$\begin{bmatrix} S(TE_1) \\ \vdots \\ S(TE_N) \end{bmatrix} = \begin{bmatrix} P^{-\frac{TE_1}{\Delta TE}} \cdot e^{-TE_1 R_2^*} & \sum_{q=1}^{Q} \alpha_q e^{-i2\pi f_{F,q} TE_1} \cdot P^{-\frac{TE_1}{\Delta TE}} \cdot e^{-TE_1 R_2^*} \\ \vdots & \vdots \\ P^{-\frac{TE_N}{\Delta TE}} \cdot e^{-TE_N R_2^*} & \sum_{q=1}^{Q} \alpha_q e^{-i2\pi f_{F,q} TE_N} \cdot P^{-\frac{TE_N}{\Delta TE}} \cdot e^{-TE_N R_2^*} \end{bmatrix} \cdot \begin{bmatrix} W \\ F \end{bmatrix} \quad (15)$$

Where, $R_2^*$ denotes the reciprocal of $T_2^*$, and $T_2^*$ denotes a transverse relaxation time under the influence of the uneven main magnetic field.

At step S153, the image signal matrix equation is solved by the least square method, to obtain the water image and the fat image of the target object.

In an example, the signal model matrix equation for the plurality of echo images above (equation (14)) is solved by using the least square method, to obtain the water image and the fat image of the target object denoted by equation (16):

$$X_{LS} = \begin{bmatrix} W_{LS} \\ F_{LS} \end{bmatrix} = [(A^T A)^{-1} A^T] J \quad (16)$$

Where, $W_{LS}$ denotes the water image, and $F_{LS}$ denotes the fat image. For example, the water image and the fat image shown in FIG. 10 may be calculated and obtained by using the equation (16) above.

In another example, the signal model matrix equation (equation (15)) above is solved by using the least square method, to obtain the water image and the fat image of the target object denoted by equation (17):

$$\begin{bmatrix} W_{LS} \\ F_{LS} \end{bmatrix} = \begin{bmatrix} S(TE_1) \\ \vdots \\ S(TE_N) \end{bmatrix}. \quad (17)$$

$$\begin{bmatrix} P^{-\frac{TE_1}{\Delta TE}} \cdot e^{-TE_1 R_2^*} & \sum_{q=1}^{Q} \alpha_q e^{-i2\pi f_{F,q} TE_1} \cdot P^{-\frac{TE_1}{\Delta TE}} \cdot e^{-TE_1 R_2^*} \\ \vdots & \vdots \\ P^{-\frac{TE_N}{\Delta TE}} \cdot e^{-TE_N R_2^*} & \sum_{q=1}^{Q} \alpha_q e^{-i2\pi f_{F,q} TE_N} \cdot P^{-\frac{TE_N}{\Delta TE}} \cdot e^{-TE_N R_2^*} \end{bmatrix}^{-1}$$

Where, $W_{LS}$ denotes the water image, and $F_{LS}$ denotes the fat image.

In this embodiment, the iteration processing is performed on the initial-guess of error phasor to obtain the optimal error phasor. The signal model matrix equation is obtained based on the optimal error phasor and is solved by the least square method to obtain the water image and the fat image of the target object. An accurate initial-guess of error phasor can reduce the probability of the occurrence of fat-water swap artifacts, and improve the accuracy of the water-fat separation.

It should be understood that although the steps in the flow charts of FIGS. 2, 7 and 9 are shown sequentially as indicated by arrows, these steps are not necessarily performed sequentially as indicated by arrows. Unless expressly stated herein, these steps are not performed in a strict order, and may be performed in other orders. Moreover, at least a portion of the steps included in FIGS. 2, 7 and 9 may include a plurality of sub-steps or a plurality of stages, which are not necessarily performed at the same time, but may be performed at different time, and the sub-steps or stages may not necessarily be performed sequentially, but may be performed sequentially or alternately with other steps, or with at least a portion of the sub-steps or stages of other steps.

Figure 11:
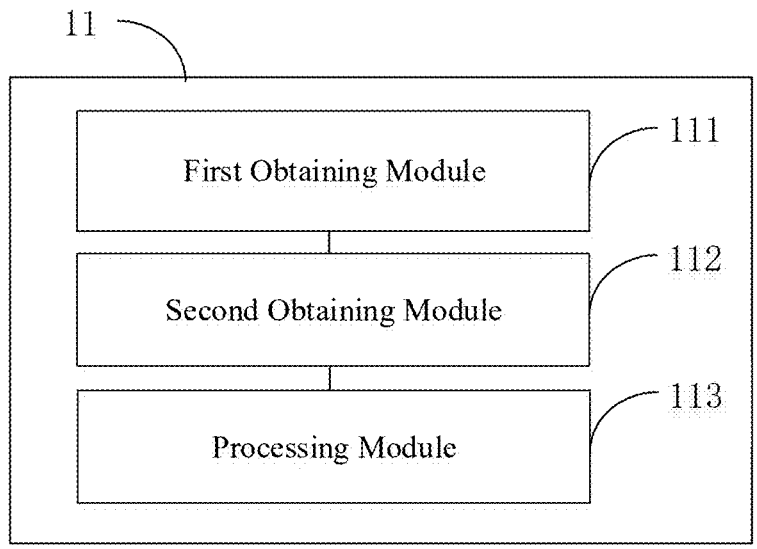
FIG. 11 is a schematic view showing a structure of a device for water-fat separation of image according to an embodiment.

In an embodiments, referring to FIG. 11, a device 11 for water-fat separation of image is provided, and the device 11 includes a first acquiring module 111, a second acquiring module 112, and a processing module 113.

The first obtaining module 111 is configured to obtain a plurality of echo images of a target object.

The second obtaining module 112 is configured to obtain an initial water and fat distribution image of the target object.

The processing module 113 is configured to determine the first error phasor candidate and the second error phasor candidate, the first error phasor candidate is used to represent an error phasor of each element corresponding to water occupying a major constituent, and the second error phasor candidate is used to represent an error phasor of each element corresponding to fat occupying a major constituent.

The processing module 113 is further configured to determine an initial-guess of error phasor corresponding to each element in the plurality of echo images among the first error phasor candidate and the second error phasor candidate based on the initial water and fat distribution image, determine an optimal error phasor based on the initial-guess of the error phasor, and acquire a water image and a fat image of the target object from the plurality of echo images according to the optimal error phasor.

In one of the embodiments, the second acquiring module 112 is specifically configured to perform a tissue segmentation on the plurality of echo images to obtain a plurality of tissue-segmented images, and determine water-fat ratios of each element in the tissue-segmented images according to prior knowledge of water-fat ratios of different tissues to obtain the initial water and fat distribution image.

In one of the embodiments, the second acquiring module 112 is specifically configured to obtain fat-suppressed images of the target object, and compare the plurality of echo images with the fat-suppressed images to obtain the initial water and fat distribution image.

In one of the embodiments, the processing module 113 is specifically configured to determine the first amplitude candidate and the second amplitude candidate of the target object based on the signal amplitudes of the plurality of echo images, and calculate the first error phasor candidate and the second error phasor candidate according to the first amplitude candidate and the second amplitude candidate.

In one of the embodiments, the processing module 113 is specifically configured to determine the first error phasor candidate and the second error phasor candidate by using a variable projection algorithm.

In one of the embodiments, the processing module 113 is specifically configured to determine an initial-guess of error phasor corresponding to each element in the plurality of echo images among the first error phasor candidate and the second error phasor candidate based on the initial water and fat distribution image, determine an optimal error phasor from the initial-guess of error phasor, and acquire a water image and a fat image of the target object according to the optimal error phasor.

In one of the embodiments, the processing module 113 is specifically configured to perform an iterative processing on the initial-guess of error phasor to obtain an optimal error phasor, obtain an signal model matrix equation by using the optimal error phasor, and solve the signal model matrix equation by the least square method to obtain the water image and the fat image of the target object.

In one of the embodiments, the processing module 113 is specifically configured to, for each element in the initial water and fat distribution image, use the first error phasor candidate as the initial-guess of error phasor if the element indicates a signal of water occupying the major constituent, and use the second error phasor candidate as the initial-guess of error phasor if the element indicates a signal of fat occupying the major constituent.

For specific limitations on the device for water-fat separation of image, reference may be made to the above limitations on the method for water-fat separation of image, and they will not described herein again. All modules in the above-described device for water-fat separation of image may be implemented in whole or in part by software, hardware, and a combination thereof. The above-mentioned modules may be embedded in or independent of the processor in the computer apparatus in a manner of hardware, or may be stored in the memory in the computer apparatus in a manner of software, so that the processor calls to perform the operations corresponding to the modules above.

Figure 12:
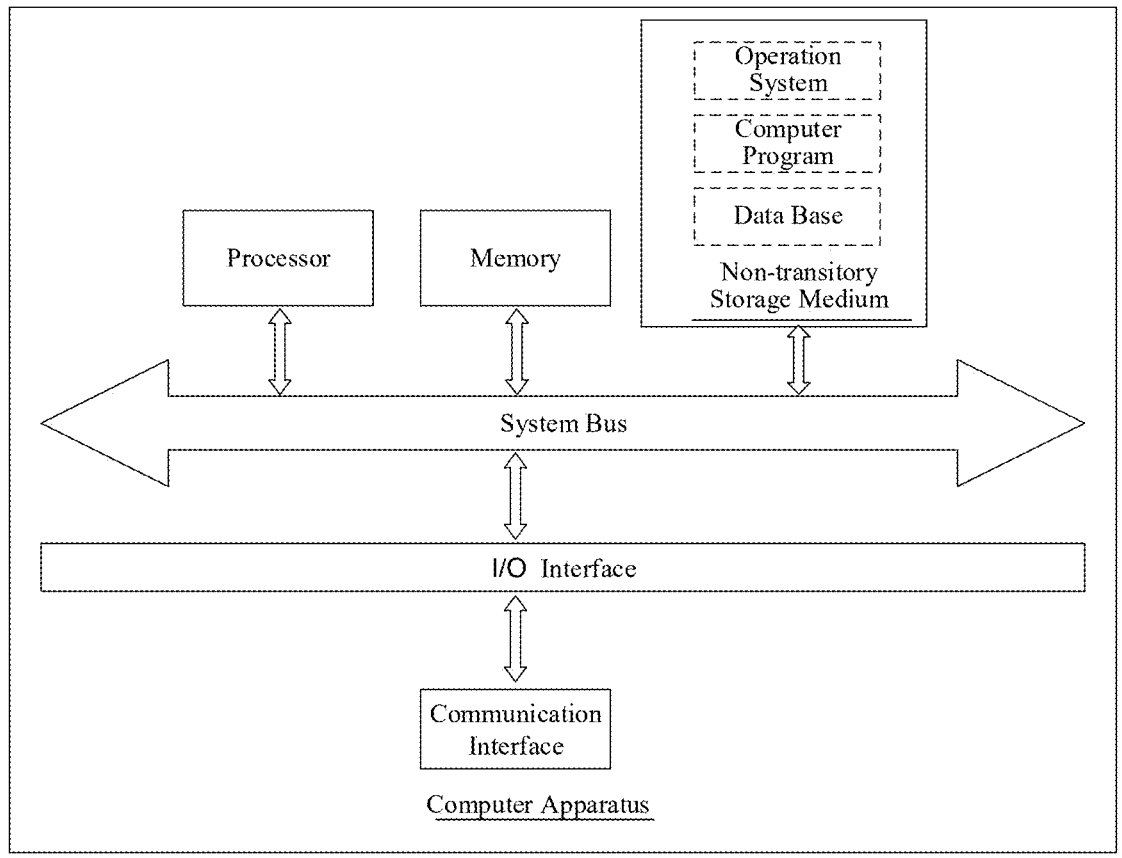
FIG. 12 is a schematic view showing an internal structure of a computer apparatus according to an embodiment.

In one of the embodiments, a computer apparatus is provided. The computer apparatus may be a server, the internal structure of which is shown in FIG. 12. The computer apparatus includes a processor, a memory, and a communication interface which are connected by a system bus. The processor of the computer apparatus is configured to provide computing and control capabilities. The memory of the computer apparatus includes a non-transitory storage medium and a memory. The non-transitory storage medium stores an operating system, a computer program, and a data base. The memory provides an environment for the operation of an operating system and a computer program in the non-transitory storage medium. The data base of the computer apparatus is used for storing initial data. The network interface of the computer apparatus is used for communication with external terminals through network communication. The computer program, when executed by the processor, performs the method for water-fat separation of image. The display screen of the computer apparatus may be a liquid crystal display screen or an electronic ink display screen, and the input device of the computer apparatus may be a touch layer covered on the display screen, or may be a key, a trackball or a touch pad provided on the housing of the computer apparatus, or may be an external keyboard, a touch pad or a mouse.

It should be understood by those skilled in the art that the structure shown in FIG. 12 is a block diagram showing only part of the structure associated with the solutions of the present application, but not intended to limit the computer apparatus to which the solutions of the present application are applied, and that the particular computer apparatus may include more or less components than those shown in the figure, or may combine with certain components, or may have different component arrangements.

In one of the embodiments, a computer apparatus is provided. The computer apparatus includes a memory having a computer program stored therein, and a processor. The processor, when executing the computer program, performs the following steps.

A plurality of echo images of a target object are obtained.

An initial water and fat distribution image of the target object is obtained.

A first error phasor candidate and a second error phasor candidate are determined, the first error phasor candidate is used to characterize the error phasor of each element corresponding to water occupying the major constituent in the element, and the second error phasor candidate is used to characterize the error phasor of each element corresponding to fat occupying the major constituent in the element.

An initial-guess of error phasor corresponding to each element in the plurality of echo images is determined among the first error phasor candidate and the second error phasor candidate based on the initial water and fat distribution image.

An optimal error phasor is determined based on the initial-guess of the error phasor, and a water image and a fat image of the target object are acquired from the plurality of echo images according to the optimal error phasor.

In one of the embodiments, a computer readable non-transitory storage medium is provided, and a computer program is stored thereon. The computer program, when executed by a processor, performs the following steps.

A plurality of echo images of a target object are acquired.

An initial water and fat distribution image of the target object is acquired.

A first error phasor candidate and a second error phasor candidate are determined, the first error phasor candidate is used to characterize the error phasor of each element corresponding to water occupying the major constituent in the element, and the second error phasor candidate is used to characterize the error phasor of each element corresponding to fat occupying the major constituent in the element.

An initial-guess of error phasor corresponding to each element in the plurality of echo images is determined among the first error phasor candidate and the second error phasor candidate based on the initial water and fat distribution image.

An optimal error phasor is determined based on the initial-guess of the error phasor, and a water image and a fat image of the target object are acquired from the plurality of echo images according to the optimal error phasor.

In one of the embodiments, a computer program product is provided and includes a computer program. The computer program, when executed by a processor, performs the following steps.

A plurality of echo images of a target object are acquired.

An initial water and fat distribution image of the target object is acquired.

A first error phasor candidate and a second error phasor candidate are determined, the first error phasor candidate is used to characterize the error phasor of each element corresponding to water occupying the major constituent in the element, and the second error phasor candidate is used to characterize the error phasor of each element corresponding to fat occupying the major constituent in the element.

An initial-guess of error phasor corresponding to each element in each echo image is determined among the first error phasor candidate and the second error phasor candidate based on the initial water and fat distribution image.

An optimal error phasor is determined based on the initial-guess of the error phasor, and a water image and a fat image of the target object are acquired from the plurality of echo images according to the optimal error phasor.

A person of ordinary skill in the art may understand that all or part of the processes in the methods of the above embodiments may be achieved by the relevant hardware instructed by the computer programs. The computer programs may be stored in a non-transitory computer readable storage medium, and when being executed, perform the processes such as those of the methods of the embodiments described above. The memory, database, or other medium recited in the embodiments of the disclosure include at least one of non-transitory and transitory memory. Non-transitory memory includes read-only memory (ROM), magnetic tape, floppy disk, flash memory, optical memory, high density embedded non-transitory memory, resistive random access memory (ReRAM), magnetoresistive random access memory (MRAM), ferroelectric random access memory (FRAM), phase change memory (PCM), or graphene memory, etc. Transitory memory includes random access memory (RAM) or external cache memory, etc. For illustration rather than limitation, RAM may be in various forms, such as static random access memory (SRAM) or dynamic random access memory (DRAM), etc. The databases involved in the embodiments of the present disclosure may include at least one of a relational database and a non-relational database. The non-relational databases may include, but are not limited to, a block chain-based distributed database, etc. The processors involved in the embodiments of the present disclosure may be but are not limited to general purpose processors, central processing units, graphics processors, digital signal processors, programmable logicians, quantum computing-based data processing logicians, etc.

The technical features of the foregoing embodiments may be arbitrarily combined. For brevity, not all possible combinations of the technical features in the foregoing embodiments are described. However, the combinations of these technical features should be considered to be included within the scope of the present disclosure, as long as the combinations are not contradictory.

The above described embodiments are several implementations of the present application, and the description thereof is specific and detailed, but cannot be construed as a limitation to the scope of the present application. It should be noted that for a person of ordinary skill in the art, various modifications and improvements may be made without departing from the concept of the present application, and all these modifications and improvements are all within the protection scope of the present application. Therefore, the protection scope of the present application shall be subject to the attached claims.

What is claimed is:

1. A method for water-fat separation of image, comprising:
   obtaining a plurality of echo images of a target object;
   obtaining an initial water and fat distribution image of the target object;
   determining a first error phasor candidate and a second error phasor candidate, the first error phasor candidate being used to represent an error phasor of each element corresponding to water occupying a major constituent in the element, and the second error phasor candidate being used to represent an error phasor of each element corresponding to fat occupying a major constituent in the element;
   determining an initial-guess of error phasor corresponding to each element in the plurality of echo images among the first error phasor candidate and the second error phasor candidate based on the initial water and fat distribution image; and
   determining an optimal error phasor based on the initial-guess of the error phasor, and acquiring a water image and a fat image of the target object from the plurality of echo images according to the optimal error phasor.

2. The method for water-fat separation of image of claim 1, wherein the acquiring the initial water and fat distribution image of the target object comprises:
   performing a tissue segmentation on the plurality of echo images to obtain a plurality of tissue-segmented images; and
   determining water-fat ratios of each element in the plurality of tissue-segmented images according to prior knowledge of water-fat ratios of various tissues, to obtain the initial water and fat distribution image.

3. The method for water-fat separation of image of claim 1, wherein the acquiring the initial water and fat distribution image of the target object comprises:
   obtaining fat-suppressed images of the target object; and
   comparing the plurality of echo images with the fat-suppressed images to obtain the initial water and fat distribution image.

4. The method for water-fat separation of image of claim 1, wherein the determining the first error phasor candidate and the second error phasor candidate comprises:
   determining a first amplitude candidate and a second amplitude candidate of water and fat signals of the target object based on the plurality of echo images and a predefined water-fat signal model; and
   calculating the first error phasor candidate and the second error phasor candidate according to the first amplitude candidate, the second amplitude candidate, and the predefined water-fat signal model.

5. The method for water-fat separation of image of claim 1, wherein the determining the first error phasor candidate and the second error phasor candidate comprises:
   determining the first error phasor candidate and the second error phasor candidate by using a variable projection algorithm and a maximum likelihood estimation, the plurality of echo images comprising at least three echo images.

6. The method for water-fat separation of image of claim 1, wherein the determining the first error phasor candidate and the second error phasor candidate comprises:
   determining the first error phasor candidate and the second error phasor candidate by solving a triangle, the plurality of echo images comprising two echo images.

7. The method for water-fat separation of image of claim 4, wherein the plurality of echo images comprise an in-phase image, and a partially-opposed-phase image.

8. The method for water-fat separation of image of claim 7, wherein the first amplitude candidate and the second amplitude candidate of the water and fat signals of the target object are determined based on the plurality of echo images and the predefined water-fat signal model to be:

$$B = \frac{1}{2}\left|M_1 + \sqrt{\frac{2M_2^2 - M_1^2(1+\cos\alpha)}{1-\cos\alpha}}\right|$$

$$S = \frac{1}{2}\left|M_1 - \sqrt{\frac{2M_2^2 - M_1^2(1+\cos\alpha)}{1-\cos\alpha}}\right|$$

wherein B denotes the first amplitude candidate, S denotes the second amplitude candidate, $M_1$ denotes a signal amplitude of the in-phase image, $M_2$ denotes a signal amplitude of the partially-opposed-phase image, and a denotes an phase angle between water and fat in the partially-opposed-phase image.

9. The method for water-fat separation of image of claim 1, wherein the determining the initial-guess of error phasor corresponding to each element in the plurality of echo images among the first error phasor candidate and the second error phasor candidate based on the initial water and fat distribution image, comprises:
   for each element in the initial water and fat distribution image,
   using the first error phasor candidate as the initial-guess of error phasor in response to the element indicating a signal of water occupying the major constituent; and
   using the second error phasor candidate as the initial-guess of error phasor in response to the element indicating a signal of fat occupying the major constituent.

10. The method for water-fat separation of image of claim 2, wherein the determining the first error phasor candidate and the second error phasor candidate comprises:
   determining the first amplitude candidate and the second amplitude candidate of water and fat signals of the target object based on the plurality of echo images and a predefined water-fat signal model; and
   calculating the first error phasor candidate and the second error phasor candidate according to the first amplitude candidate, the second amplitude candidate and the predefined water-fat signal model.

11. The method for water-fat separation of image of claim 3, wherein the determining the first error phasor candidate and the second error phasor candidate comprises:

determining the first amplitude candidate and the second amplitude candidate of water and fat signals of the target object based on the plurality of echo images and a predefined water-fat signal model; and calculating the first error phasor candidate and the second error phasor candidate according to the first amplitude candidate, the second amplitude candidate and the predefined water-fat signal model.

12. The method for water-fat separation of image of claim 1, wherein the determining the optimal error phasor from the initial-guess of the error phasor, and acquiring the water image and the fat image of the target object from the plurality of echo images according to the optimal error phasor, comprise:

performing an iterative smooth filtering processing on the initial-guess of error phasor to obtain the optimal error phasor;

obtaining a signal model matrix equation by using the optimal error phasor; and solving the signal model matrix equation by a least square method to obtain the water image and the fat image of the target object.

13. The method for water-fat separation of image of claim 1, wherein at least one element of the initial water and fat distribution image comprises a fat fraction.

14. The method for water-fat separation of image of claim 1, wherein the plurality of echo images are two-dimensional images, and the element in each of the plurality of echo images is a pixel.

15. The method for water-fat separation of image of claim 1, wherein the plurality of echo images are three-dimensional images, and the element in each of the plurality of echo images is a voxel.

16. A computer product, comprising a non-transitory computer readable medium storing a computer program, wherein, the computer program, when executed by a processor, causes the processor to perform steps of the method of claim 1.

* * * * *